April 27, 1943.  H. S. POWER  2,317,801
GARDEN TOOL
Filed July 29, 1941
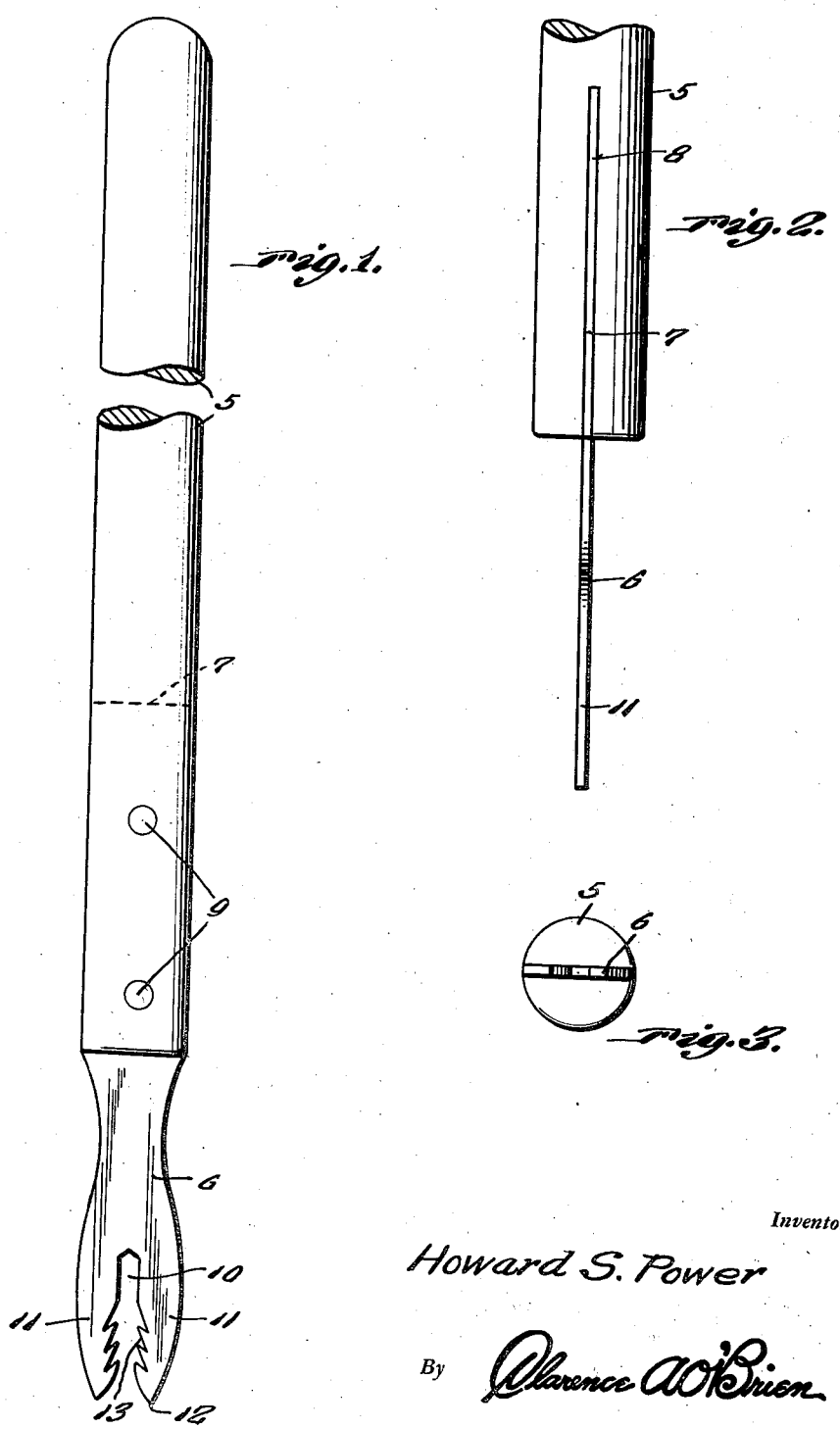
Inventor
Howard S. Power
By Clarence A. O'Brien
Attorney Patented Apr. 27, 1943

2,317,801

UNITED STATES PATENT OFFICE 2,317,801

GARDEN TOOL

Howard S. Power, Pittsburgh, Pa.

Application July 29, 1941, Serial No. 404,567

1 Claim. (Cl. 294—50.6)

This invention relates broadly to garden tools and more particularly to a tool of this character particularly designed for removing weeds and crab grass in a positive and efficient manner and with minimum effort on the part of the gardener.

The invention together with its objects and advantages will be best understood from a study of the following description taken in connection with the accompanying drawing wherein:

Figure 1 is a face view of a garden tool embodying the features of the present invention.

Figure 2 is an edge elevational view thereof.

Figure 3 is an elevational view of the tool as viewed from the blade-equipped end thereof.

Referring more in detail to the drawing it will be seen that in the preferred embodiment thereof my improved garden tool embodies a handle 5 of wood or other suitable material and of any desired length, together with a blade 6 that has a tang portion 7 fitted within a notch 8 provided longitudinally in the handle 5 at one end thereof, and secured to the handle through the medium of rivets or the like 9.

A salient feature of the present invention is in providing the working end of the blade 6 with a longitudinal slot 10 extending medially of the blade and dividing the blade into a pair of pulling prongs 11—11.

Each of the prongs 11 is tapered to a point 12 at the free end of the blade to facilitate initial insertion of the blade into the ground, while the inner edge of each prong 11 formed by the slot 10 is provided with saw teeth 13 to insure a positive gripping engagement with the root of the weed or crab grass and consequently a complete extraction of the root from the ground.

It will be found, when using the tool, that the most advantageous results will be obtained by forcing the blade 6 into the ground at the base of the plant to be removed and then at one and the same time, or in the same action, rotate the tool while withdrawing the blade from the ground. By such manipulation of the tool it will be found that the entire weed or crab grass plant is extracted with its root. Thus the device will be found especially adapted for removing crab grass and weeds from flower beds, and it is intended, in actual practice, to have the handle 5 of such a length as to permit use of the tool for the purpose stated without one assuming a stooping position.

It is believed that the many advantages of a garden tool embodying the features of the present invention will be appreciated by those skilled in the art without further detailed description.

Having thus described the invention what is claimed as new is:

A garden tool of the character described comprising a handle and a blade secured to the handle at one end thereof, said blade embodying a pair of integral, coextensive and laterally spaced prongs each of which is tapered longitudinally to a point at its free end, and the confronting edges of said prongs defining therebetween a relatively narrow slot, and with the edges of said prongs thus defining the slot being provided with saw teeth, said saw teeth terminating short of the inner end of the slot and adapted to accommodate weeds engaged by the teeth.

HOWARD S. POWER.